M. SWEET.
Wheel Cultivator.
No. 68,803.  Patented Sept. 10, 1867.
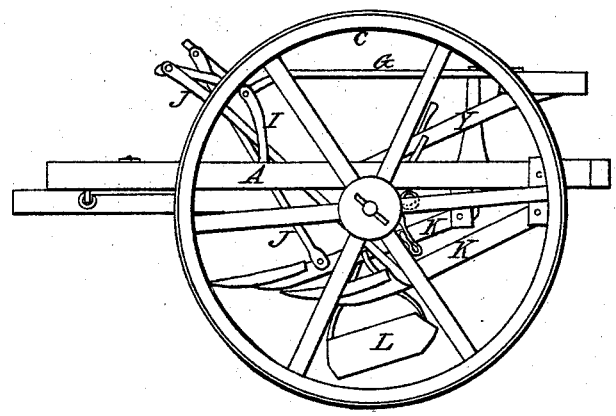
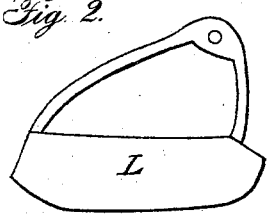
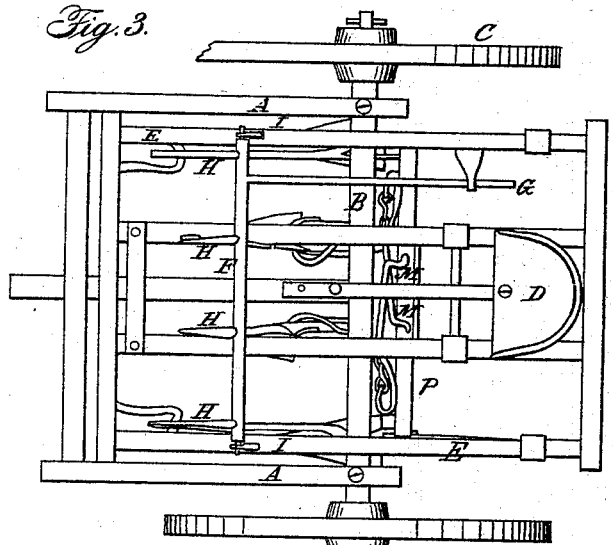
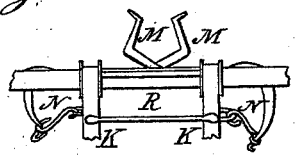
Witnesses:
Inventor:
Mordecai Sweet
per
Alexander & Mason
Attys

United States Patent Office.

MORDECAI SWEET, OF RICHLAND, INDIANA.

Letters Patent No. 68,803, dated September 10, 1867.

IMPROVEMENT IN CULTIVATORS.

The Schedule referred to in these Letters Patent and making part of the same.

TO ALL WHOM IT MAY CONCERN:

Be it known that I, MORDECAI SWEET, of Richland, in the county of Rush, and in the State of Indiana, have invented certain new and useful Improvements in Cultivators; and do hereby declare that the following is a full, clear, and exact description thereof, reference being had to the accompanying drawings, and to the letters of reference marked thereon.

In the annexed drawings, making part of this specification, A represents a square frame, which is permanently secured upon the axle B, said axle being supported upon the wheels C C. Placed within the frame A, and pivoted or hinged to it at its forward end, is a frame, E. This frame E lies upon the axle B, but is not secured to it, and is provided with ears on its under side, back of the axle, to which are pivoted the shanks K K, which carry upon their lower ends the cultivator-teeth. D represents the driver's seat, which is situated on the rear end of a bar, Y, projecting from frame A. I I represent two uprights, which are erected upon frame E, and which support a shaft, F, said shaft lying across the frame, as seen in Figure 3. The shaft F has on one side a handle, G, which passes back to the driver's seat, and on the other side four or more arms H H. J J represent connecting-rods, whose upper ends are pivoted to the outer ends of the arms H H, and whose inner ends, being divided so as to embrace the shanks K, are pivoted to said shanks. By causing the shaft F to partially revolve, by means of the handle G, the arms H H, through their connecting-rods J J, raise the shanks, so as to throw their teeth from the earth, or lower them so that they will enter it. On the inside of the two centre shanks K are secured the shields L for protecting the corn row which these shanks straddle from being injured by clods or too much earth. M M represent two levers, which are pivoted not far from their lower ends to a bar, P, which lies under and is secured to the frame E. The upper ends of these levers are provided with foot-pads or pieces, and are situated so as to be operated upon by the feet of the operator while sitting in the seat D. The lower ends of these levers are connected by a link, N, to the outsides of the centre shanks K. These two shanks are connected together by a rod or bar, R.

The operator, by bearing down upon these levers alternately, may shift the shanks K K, to which they connect, to one side or the other, to avoid running over the corn where it is not planted straight, or is out of its row. By bearing down with the right foot the teeth on the shanks are shifted to the left, and by bearing down on the left the teeth are shifted to the right. The operator may thus, with his hand upon lever G, and his feet upon levers M M, completely control the teeth on the shanks, removing and inserting them in the earth, or shift them from side to side to suit the corn.

What I claim, is—

The arrangement of the shanks K with the shaft F, with its arms, handle, and connecting-rods, and with the levers M M, substantially as and for the purpose set forth.

In testimony that I claim the foregoing I have hereunto set my hand this 27th day of July, 1867.

MORDECAI SWEET.

Witnesses:
A. E. GRAHAM,
JAMES O'BRIEN.